United States Patent

Murray et al.

[11] Patent Number: 5,834,120
[45] Date of Patent: Nov. 10, 1998

[54] FIRE PROTECTION MATERIAL

[75] Inventors: Keith Murray, Darlington, England;
Clifton Philpott, Pasadena, Calif.;
Frank K. Chi, Williamsville, N.Y.;
Timothy S. Lintz, Grand Island, N.Y.;
Ralph W. Paddock, Newfane, N.Y.;
Mark D. Stahlman, Lewiston, N.Y.

[73] Assignees: Unifrax Corporation, Niagara Falls, N.Y.; Darchem Engineering Ltd., United Kingdom

[21] Appl. No.: 652,553

[22] PCT Filed: Dec. 12, 1994

[86] PCT No.: PCT/GB94/02717

§ 371 Date: Oct. 30, 1996

§ 102(e) Date: Oct. 30, 1996

[87] PCT Pub. No.: WO95/16008

PCT Pub. Date: Jun. 15, 1995

[30] Foreign Application Priority Data

Dec. 11, 1993 [GB] United Kingdom .................. 9325409
Jul. 16, 1994 [GB] United Kingdom .................. 9414405

[51] Int. Cl.⁶ .................. C09K 21/02; H01B 7/34
[52] U.S. Cl. .................. 428/404; 428/920; 428/921; 442/136; 252/2
[58] Field of Search .................. 428/920, 921, 428/404; 442/136; 252/2

[56] References Cited

U.S. PATENT DOCUMENTS 4,292,188  9/1981  Barone et al. .................. 252/62
4,315,075  2/1982  Gardner .................. 521/71
4,443,520  4/1984  Braithwaite, Jr. .................. 428/438
4,521,333  6/1985  Graham et al. .................. 252/606
4,543,281  9/1985  Pedersen et al. .................. 428/36
4,600,634  7/1986  Langer .
4,612,239  9/1986  Dimanshteyn .................. 428/920 X

FOREIGN PATENT DOCUMENTS 2844693     10/1978  Germany .
42200518 A1  6/1992  Germany .
84303739     6/1984  United Kingdom .
0393 8113    2/1990  United Kingdom .

OTHER PUBLICATIONS

WO 9420965 Abstract.

Alumina Trihydrate: Flame–Retarding, Smoke–Suppressing Filler, Joseph Z. Keating, Jul.–Aug. 1980, pp. 23–35.

*Primary Examiner*—Daniel Zirker
*Attorney, Agent, or Firm*—Renner, Kenner, Greive, Bobak, Taylor & Weber.

[57] ABSTRACT

A fire protection material is provided for protecting electrical cables and components. The material comprises an endothermic-reactive insulating fibrous material including an inorganic endothermic filler which undergoes multiple endothermic reactions between the range 100° C. and 750° C.; inorganic fiber material; and an organic polymer binder. The weight ratio of endothermic filler to inorganic fiber is preferably in the range of 0.25 to 3.0. The fire protection material is in the form of semi-rigid or rigid board or may be moulded into sections.

13 Claims, 5 Drawing Sheets

TABLE 1
16mm Board

- Thickness — 16 mm ±3mm
- Weight / sq m — 13 kg ±15%
- Thermal Conductivity mean — 0.113 W/mK @ 60°C

FIG. 1

TABLE 2
1hr System

- Nominal Thickness — 32 mm
- Weight / sq m — 31 kg ±15%

FIG. 2

TABLE 3
19mm Board

- Thickness — 19 mm ± 3mm
- Weight / sq ft — 15.5 kg ± 15%
- Thermal Conductivity mean — 0.113 W/mK @ 60°C

FIG. 3

TABLE 4
3hr System

- Nominal Thickness — 76 mm
- Nominal Weight / sq m — 64 kg

FIG. 4

TABLE 5
Conduit
1 hr System

| Moulded In Two Half Sections | |
|---|---|
| • Nominal Thickness | 32mm |
| • Nominal Weight kg / linear m. | |
| 3/4" | 6.7 |
| 1" | 7.6 |
| 2" | 10.4 |
| 3" | 13.6 |
| 4" | 16.4 |
| 5" | 19.4 |
| 6" | 22.4 |

FIG. 5

TABLE 6
Conduit
3 hr System

| | |
|---|---|
| • Nominal Thickness | 76mm |
| • Nominal Weight kg / linear m. | |
| 3/4" | 26.4 |
| 1" | 28.2 |
| 2" | 34.7 |
| 3" | 42.0 |
| 4" | 48.4 |
| 5" | 55.1 |
| 6" | 62.0 |

FIG. 6

FIRE PROTECTION MATERIAL

This invention relates to fire protection materials.

In many technical fields, it is important to provide fire protection for equipment and plant. In electrical applications, this can cause difficulties because although an insulating material will protect the plant from fire encroaching onto it, by the nature of the material it will retain the heat generated by the plant within the insulative envelope, and may cause overheating of the plant.

For example, fire protection in areas with a high concentration of power transmission, instrument and communication cables and wires is vital to ensure a systematic and safe control and, if necessary, emergency shut-down of plant. These services are essential to utilities in the petrochemical and power generating fields. It is also vital that control and emergency shut-down valves, valve-actuators and associated switch/junction boxes are also protected against fire.

All the items above dissipate heat under their normal operating conditions. The electrical cables generate heat due to their internal line resistance, valve actuators also generate heat due to internal pressures. Valves themselves dissipate the heat due to the process temperatures involved. Accordingly, a fire protection system, while being a good fire barrier, should also ensure minimal restriction to the heat dissipation from these items. This will cause minimum reduction in the amount of current carrying capacity of electrical cables (ampacity derating) and prevent the overheating of valve actuators.

Previously, inorganic materials in the form of fibre blankets constructed from alumino-silicate fibres, silicate fibres, mineral fibres, or a combination of such fibres, have been used for the fire protection of conduits, cable trays and valve actuators. In order to provide one hour fire protection these are usually fitted around the protected items to a thickness of 3 inches or more. These fibre blankets all have a low thermal conductivity (especially in the ambient temperature range) which not only insulates from the effect of fire but even more effectively retards the dissipation of heat from the protected equipment and requires a substantial reduction in the current carrying capacity of electrical cables, deratings of 56% and greater being typical of such fire blanket systems.

It is also known to provide materials which are designed to retard the spread of fire and heat by an endothermic reaction. For example, it is known from prior art documents to use a hydrate within the insulating material, which dehydrates endothermically in the event of fire and thus absorbs heat from the fire. For example, U.S. Pat. No. 4,315,075 and U.S. Pat. No. 4,600,634 describe the use of alumina trihydrate ($Al_2O_3.3H_2O$) in similar applications to retard combustion by an endothermic reaction. The water vapour also dilutes combustible gases which may be present during a fire, retarding combustion. With this compound, the water of hydration begins to be liberated at about 230° C. with the peak release at about 320° C. and 90% of complete dehydration at around 400° C., resulting in a single endothermic reaction.

A disadvantage of such known materials is that the maximum protection is only up to about 400° C. and only over a fairly restricted temperature range after which the protection is significantly reduced. An object of the present invention is to provide an improved fire protection material.

According to the present invention, a fire protection material is characterized by the addition of an endothermic inorganic compound which reacts endothermically on the application of heat through at least two mechanisms so as to bring about multiple endothermic reactions in the event of fire.

The preferred material is formed into semi-rigid sections either in sheet form or moulded into conduit sections or sections specially shaped to encapsulate particular components.

Preferably the endothermic inorganic compound is an hydrated compound and at least one of the mechanisms may comprise dehydration. Suitably, the hydrated inorganic compound is in combination with a fibrous component to provide a substantially rigid or semi-rigid sheet or moulded section, the ratio of inorganic endothermic component to fibre being between 0.25 and 3.0.

The endothermic inorganic compound preferably dehydrates in a first endothermic mechanism and then emits an inert gas on further heating in a second endothermic mechanism.

The dehydration reaction releases water vapour which is inert. Preferably the inorganic compound is a hydrated carbonate. In this case, the inorganic compound reacts firstly to release the water of hydration, and secondly to release carbon dioxide as in the following chemical equations for a bivalent metallic element M:

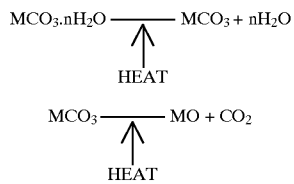

$$MCO_3.nH_2O \xrightarrow{HEAT} MCO_3 + nH_2O$$

$$MCO_3 \xrightarrow{HEAT} MO + CO_2$$

The carbon dioxide released in the second endothermic mechanism is inert and therefore will tend to further stifle any fire which may exist.

Preferably, the endothermic reactions continue to absorb heat from the surroundings up to 750° C. The endothermically reactive inorganic compound may be Magnesium Carbonate-Hydrate optionally in combination with Magnesium Calcium Carbonate. This may be supplemented with 1–2% hydrated Zinc Borate or Zinc Stanate, 3–5% crude Vermiculite.

In a preferred arrangement, a fire protection material in accordance with the invention comprises an endothermic-reactive insulating fibrous material including:

(a) an inorganic endothermic filler which undergoes multiple endothermic reactions between the range 100° C. to 750° C.;

(b) inorganic fibre material; and, (c) an organic polymer binder.

The fire protection material may be a semi-rigid or rigid board or moulded section. The weight ratio of endothermic filler of part (a) to the inorganic fibre of part (b) is preferably in the range of 0.25 to 3.0. The filler preferably has a particle top size of >150 micrometers. The weight ratio of organic to inorganic constituents is preferably less than 0.2.

Suitably, the fire protection material is in the form of a semi-rigid or rigid fibrous sheet or moulded section composed of material components in the following ratios:

|  | Example 1 | Example 2 | Example 3 |
|---|---|---|---|
| Fibre | 40% | 25% | 20% |
| Hydrated | 56% | 69% | 60% |

|  | Example 1 | Example 2 | Example 3 |
|---|---|---|---|
| Magnesium Carbonate |  |  |  |
| Other Compounds (Organic binders, etc.) | 4% | 6% | 20% |

The inorganic fibre is preferably chosen from materials which can withstand extremely high temperatures (about 1260° C.) without significant detrimental changes in physical properties.

This mixture is shaped in the form of a sheet or moulded section and may have a sacrificial waterproof coating. The thickness of the material is determined by the fire protection required. Examples of suitable sections form Tables 1–6 (FIGS. 1–6) hereof.

Therefore, according to another aspect of the invention, there is provided a fire protection material comprising inorganic fibre, an inorganic hydrated carbonate endothermic material which provides multiple endothermic reactions across a wide temperature range in the event of fire, and an organic binder, the fire protection material in a fire losing at least 50% by weight of the endothermic material through reaction and producing voids in which carbon dioxide, released during said endothermic reactions, is trapped in a refractory char thereby reducing the thermal conductivity of the fire protection material further protecting covered components through improved insulation.

The fire protection material of the present invention is preferably for the protection of electrical cables and components. Therefore, the invention also includes a method for protecting power transmission, instrument and communication cables and wires against fire comprising providing a fire protection material as aforesaid and enveloping the cables and wires to be protected in said material such that, in the event of fire, the fire protection material undergoes multiple endothermic reactions absorbing heat.

BRIEF DESCRIPTION OF THE DRAWINGS

FIG. 1 is a Table of the mean thermal conductivity for a 16 mm thick fire protection board, weighing 13 Kg.

FIG. 2 is a Table representing an exemplary board of fire protection material used in the 1 hour system.

FIG. 3 is a Table of the mean thermal conductivity for a 19 mm thick fire protection board weighing 15.5 Kg.

FIG. 4 is a Table representing an exemplary board of fire protection material used in the 3 hour system.

FIG. 5 is a Table representing the Nominal Weight (Kg/linear m) for a 32 mm thick fire protection board molded in two half sections for use in the 1 hour system.

FIG. 6 is a Table representing the Nominal Weight (Kg/linear m) for a 76 mm thick fire protection board molded in two half sections for use in the 3 hour system.

Figure 7:
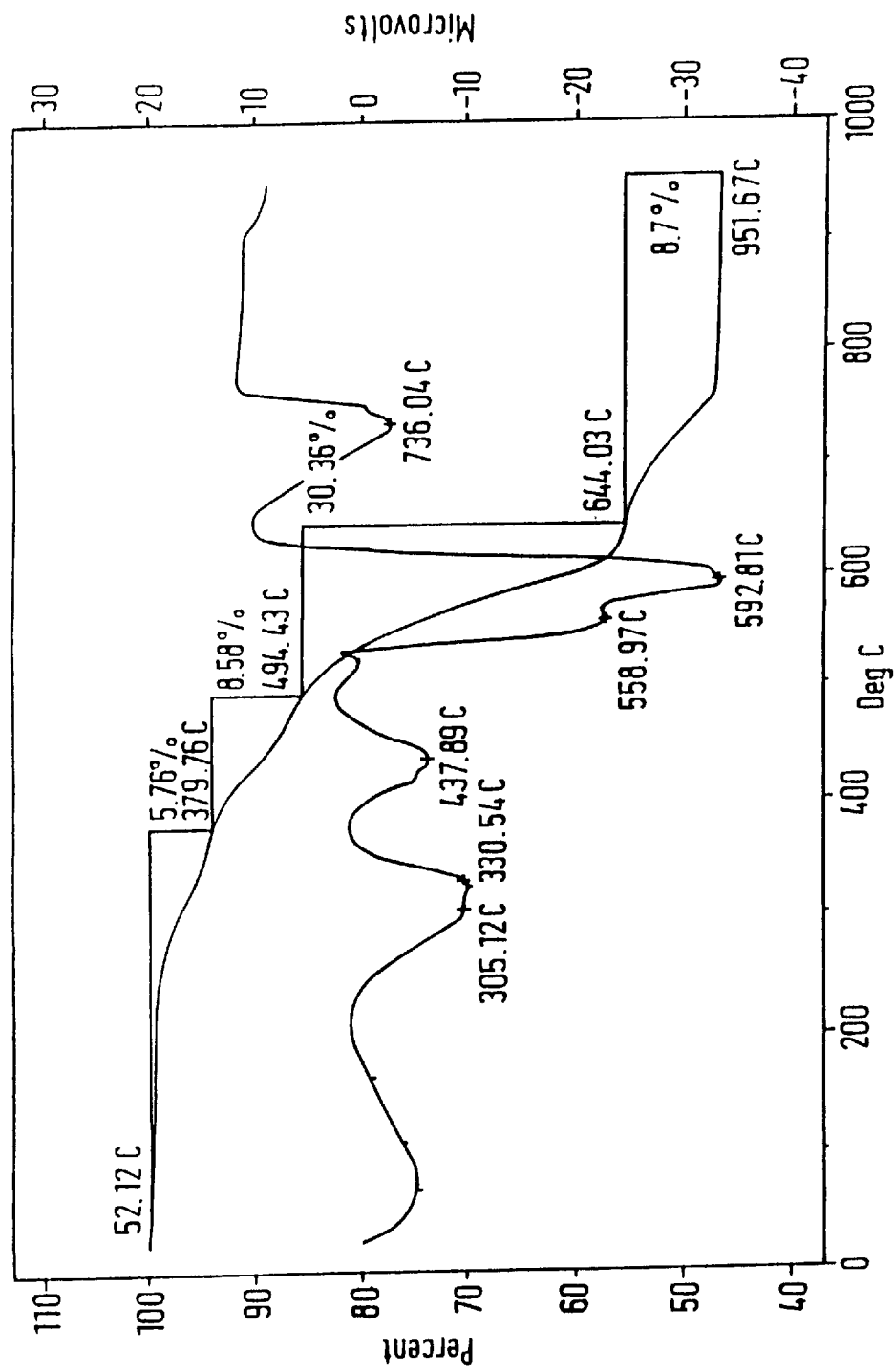
FIG. 7 is a graph depicting the endothermic reaction spectrum for hydrated magnesium carbonate.

The invention will now be described by way of example with reference to a preferred embodiment of fire protection material.

The fire protection material comprises inorganic fibres, inorganic endothermic material and organic binder. The inorganic fibres are refractory materials which combine high strength together with good thermal resistance and the ability to withstand thermal shock. The fibres form the matrix for retaining high levels of the endothermic filler in interstices between fibres. Suitable fibres for this purpose are silica, alumino-silicate and glass fibre or other fibres often classified as MMVF and the preferred fibre is aluminosilicate. The mean fibre diameter should be in the range 1 to 8 micrometers with a full range of 0.5 to 12 micrometers and an original maximum fibre length of up to 150 mm.

The typical physical properties for the aluminosilicate inorganic fibre material are:

Classification Temperature 1260° C.

Melting Temperature 1790° C.

Normal Packaging Density 96–192 kg/m$^3$

Specific Gravity 2.73

Specific Heat 1130 j/kg°C.

Fibre Tensile Strength 1.4 GPa

Preferably, the fibre content may be 20–80% and most preferably is about 20–40%.

The inorganic endothermic material is in the form of a powder preferably with a topside >150 micrometers, preferably about 250 micrometers. The endothermic material filler is able to provide multiple endothermic reactions across a temperature spectrum from 100° C. to 750° C. and comprises hydrated magnesium carbonate. The loss on ignition for the endothermic material should be >50% by weight. The weight ratio of endothermic filler to inorganic fibre is in the range 0.25 to 3.0 and suitably the endothermic material comprises 50–75%. The hydrated magnesium carbonate is preferably Ultracarb HFD, the technical details of which are as follows:

Chemical Analysis

|  |  | % |
|---|---|---|
| Magnesium | MgO | 37–40 |
| Calcium | CaO | 6–8 |
| Silicon | SiO$_2$ | 0.2–0.6 |
| Aluminium | Al$_2$O$_3$ | <0.1 |
| Potassium | K$_2$O | <0.02 |
| Iron | Fe$_2$O$_3$ | <0.06 |
| Loss on ignition | (44% CO$_2$ + 9% H$_2$O) | 52–54 |

Typical Physical Properties

| Specific Gravity | 2.5 |
|---|---|
| Loose bulk density | 1.1 kg/l |

Particle Size—(by Wet Screening)

| B.S. mesh | Aperature (microns) | Percentage finer |
|---|---|---|
| 30 | 500 | 94–100 |
| 60 | 250 | 80–95 |
| 150 | 100 | 30–75 |

The amount of organic binder is preferably less than 20% and suitably about 4.5%. The binder is selected from various polymers and elastomers in latex form: the preferred binder being an acrylic resin type which provides excellent heat resistance, ongoing properties and non-corrosive combustion products. The material may also include Vermiculite—sodium silicate or other suitable filler material.

The fire protection material of the present invention provides an increased thermal conductivity in normal use over prior materials due to the higher density (in the range 250 to 1100 kg/m$^3$) which allows for a better dissipation of the heat generated by items encompassed by the fire protection material.

After endothermic reaction in the event of fire, the material of the present invention, due to the large particle size and large loss on ignition, produces trapped pockets of carbon dioxide (still carbon dioxide being a better insulation than still air 0.0166 W/mK compared to 0.0262 W/mK at 300 Kelvin) in a refractory char therefore reducing the thermal conductivity of the material and therefore creating further good insulation in the fire where the cables need to be protected against the heat of the fire.

Figure 8:
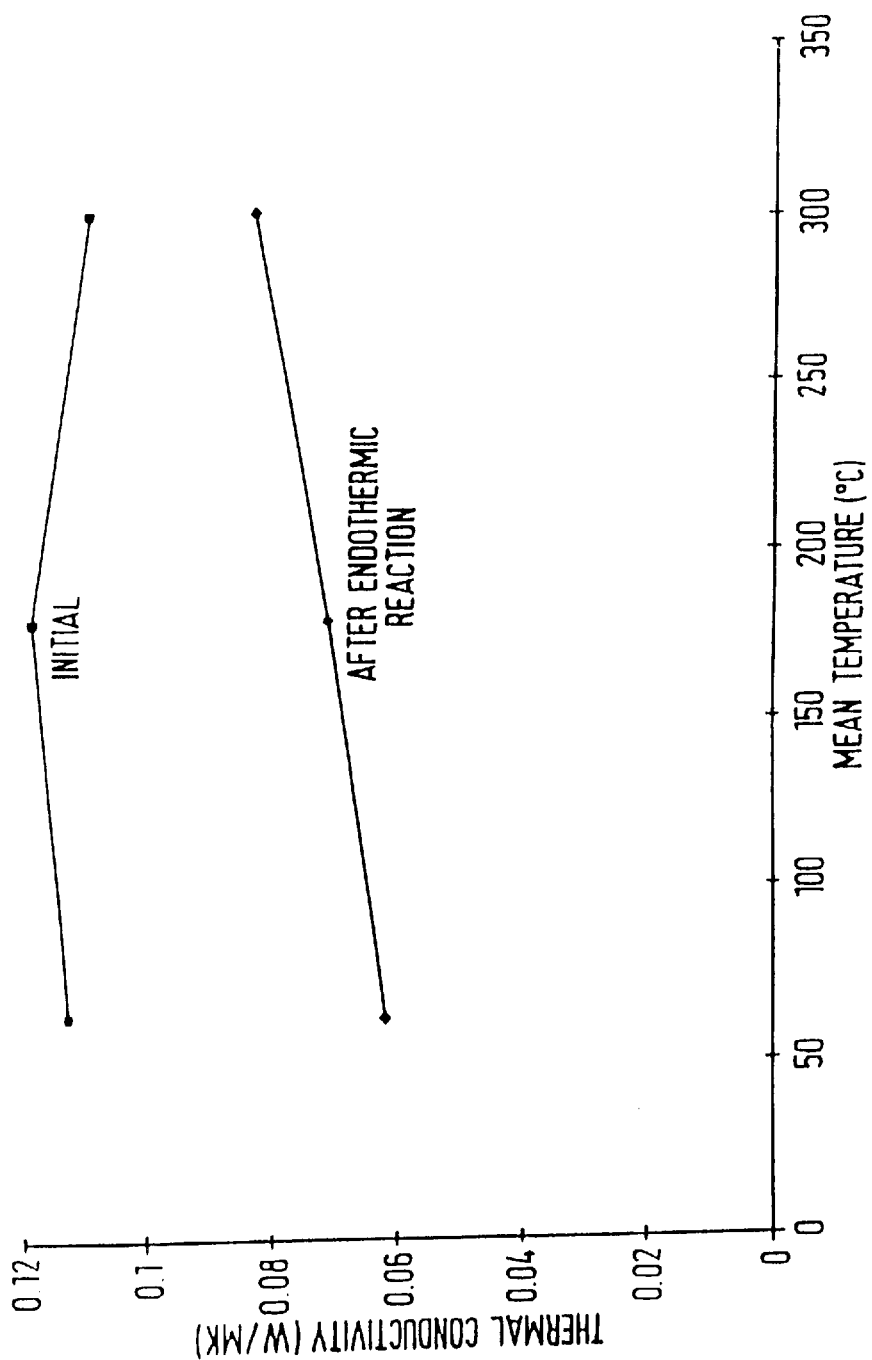
FIG. 8 is a graph depicting the results of a thermal conductivity test on the endothermic reactive-insulating material, initially and after endothermic reaction.

The typical endothermic reaction spectrum for hydrated magnesium carbonate is shown in FIG. 7 and the results of a thermal conductivity test on the endothermic reactive-insulating material is shown in FIG. 8.

The semi-rigid endothermic board or shaped material of this invention may be made by mixing the individual ingredients together with water to form a slurry. This is then transferred to filter screens where the material is densified by vacuum pressing and/or calendaring or squeezing and dried, either in a drying oven or by passing through heated rolls.

The material can then be provided with a sacrificial fabric scrim adhered to its surfaces to give added strength, abrasion resistance and resistance to cracking for certain applications involving tight bends or radii. The final material is preferably substantially rigid and either cut or moulded to conform to cable tray shapes so as to provide cable tray lining or other component fire protection.

The arrangement of the present invention provides a composition which minimizes the fuel source due to the low organic content while maintaining the strength and physical integrity required in fire protection applications.

The new material of this invention uses an endothermic material which provides multiple endothermic reactions across the temperature range 100° C. to 750° C. which allows an effective retardation of heat flow through the material using all of the material thickness whereas a single endothermic reaction remains inactive for a large part of the temperature spectra. In addition, whereas the prior art, such as alumina trihydrate material would typically lose a maximum of 34.6% on dehydration, the preferred material of the present invention has a minimum of 50% loss on ignition whilst still retaining its integrity and provides trapped pockets of carbon dioxide providing continued thermal insulation.

We claim:

1. A fire protection material comprising an endothermic-reactive insulating fibrous material comprising:

(a) an inorganic endothermic filler which undergoes multiple endothermic reactions between the range 100° C. and 750° C. wherein the endothermic inorganic compound has a particle top size greater than 150 $\mu$m;

(b) inorganic fiber material; and, (c) an inorganic polymer binder.

2. A fire protection material according to claim 1, wherein the weight ratio of endothermic filler of part (a) to the inorganic fibre of part (b) is in the range of 0.25 to 3.0.

3. A fire protection material according to claim 1, wherein the weight ratio of endothermic filler of part (a) to the inorganic fibre of part (b) is in the range of 0.25 to 3.0.

4. A fire protection material according to claim 1, wherein the weight ratio of organic to inorganic constituents is less than 0.2.

5. A fire protection material according to claim 1, comprising 50–75% inorganic endothermic material, 20–40% fibre material and less than 20% organic binder.

6. A fire protection material according to claim 1, wherein the endothermic inorganic compound is a hydrated compound and at least one of the mechanisms comprises dehydration.

7. A fire protection material according to claim 1, wherein the endothermic inorganic compound dehydrates in a first endothermic mechanism and then emits an inert gas on further heating in a second endothermic mechanism.

8. A fire protection material according to claim 7, wherein the dehydration reaction releases water vapour which is inert.

9. A fire protection material according to claim 7, wherein the inorganic compound is a hydrated carbonate and wherein, in the event of fire, the inorganic compound reacts firstly to release the water of hydration, and secondly to release carbon dioxide.

10. A fire protection material according to claim 7, wherein the endothermically reactive inorganic compound is Magnesium Carbonate-Hydrate.

11. A fire protection material according to claim 1, wherein the endothermic inorganic compound has a particle top size greater than 250 $\mu$m.

12. A fire protection material comprising inorganic fibre, an inorganic hydrated carbonate endothermic material having a particle top size greater than 150 $\mu$m which material provides multiple endothermic reactions across a wide temperature range in the event of fire, and an organic binder, the fire protection material in a fire losing at least 50% by weight of the endothermic material through reaction and producing voids in which carbon dioxide, released during said endothermic reactions, is trapped thereby reducing the thermal conductivity of the fire protection material further protecting covered components through improved insulation.

13. A method for protecting power transmission, instrument and communication cables and wires against fire comprising providing a fire protection material according to claim 1 and enveloping the cables and wires to be protected in said material such that, in the event of fire, the fire protection material undergoes multiple endothermic reactions absorbing heat.

* * * * *